Patented July 10, 1945

2,380,259

UNITED STATES PATENT OFFICE 2,380,259

CLEANSING COMPOSITION

Frederic E. Pierce, Los Angeles, Calif.

No Drawing. Application April 6, 1942,
Serial No. 437,776

3 Claims. (Cl. 252—135)

This invention pertains to improved cleansing compositions having a great variety of uses. The cleansing composition of the present invention is characterized by its free rinsing properties, the presence of an integral buffer, the fact that the composition is sudless, by its ability to exert a bactericidal, fungicidal and insecticidal effect with the result that the objects or products cleansed therewith are rendered substantially sterile, by a remarkable ability to dislodge and disperse oils, fats, stains, dirt, spray residues, scale and other foreign matter, and by its ability to make soluble and inhibit the precipitation of magnesium and calcium compounds, thereby permitting the cleansing agent to be employed with hard water without the formation of insoluble curds or precipitates which may impair the brilliance of objects cleansed with the composition of the present invention.

The product having these and other desirable properties can only be attained by the conjoint use of the ingredients and in the proportions hereafter specifically set forth.

Trisodium phosphate has been employed as an ingredient in various detergents and has been used as a cleaning agent heretofore, but trisodium phosphate has a high titratable alkalinity and cannot be successfully employed in many cleansing operations, such as for example, the cleaning of glassware, silverware, china or the like. Moreover, when used in washing or cleaning clothes, linens, etc., it does not remove acid stains, blood stains and solid impurities and lacks the bactericidal, insecticidal and fungicidal properties of the composition hereinafter described. However, I have discovered that trisodium phosphate has numerous desirable qualities which may be retained, and in addition, new properties developed by suitably compounding trisodium phosphate with other ingredients.

The present invention is primarily directed to a cleansing composition including trisodium phosphate, tetrasodium pyrophosphate, a double salt of trisodium phosphate and sodium nitrate. This generic composition may then be further modified for particular uses. For example, it has been found that the addition of potassium nitrate permits the resulting product to be used in the form of aqueous solutions as a cleansing agent for the removal of arsenical, lead and other normally toxic spray residues from apples, vegetables and other materials. Such solution may also be employed with great advantage as a spray on deciduous as well as evergreen trees for the removal of insectary pests, scale, etc. The generic article of manufacture may also be combined with finely divided diatomaceous earth, preferably in calcined condition, the resulting composition of matter being particularly well adapted for use in laundry work, the diatomaceous earth being maintained in suitable dispersion and functioning as an absorbent and scouring agent. the generic composition, by reason of its dispersing characteristics, permitting rapid and complete removal of the suspension from the clothing by a simple rinsing operation. Many other uses will be mentioned hereinafter.

An object of the present invention, therefore, is to provide a new article of manufacture particularly adapted for use as a cleansing and sterilizing agent.

Another object of the present invention is to provide a composition consisting essentially of trisodium phosphate, tetrasodium pyrophosphate and a double salt of trisodium phosphate and sodium nitrate.

A further object of the invention is to provide means and methods whereby red scale, black scale and other forms of scale-like pests commonly infesting various fruit and decorative trees may be readily removed without injury to the foliage or fruit.

An object of the invention is to provide a composition adapted for use in the treatment of vegetables and fruits for the removal of spray residues therefrom.

A still further object of the invention is to provide a free rinsing, sudless cleansing composition particularly adapted for use in laundries, in the cleaning of machinery, floors and walls, the washing and cleansing of glassware, china, silverware, utensils, etc., for use in and the cleansing of radiators, boiler tubes and wherever the formation of insoluble deposits in scale is to be inhibited, etc.

Other objects and uses of the present invention embraced hereby will become apparent to those skilled in the art from the following detailed description.

As previously stated, the generic composition includes trisodium phosphate (generally represented as $Na_3PO_4 \cdot 12H_2O$ and more clearly representable as $4Na_3PO_4 \cdot 44H_2O$), tetrasodium pyrophosphate (ordinarily available in anhydrous form and represented by the formula $Na_4P_2O_7$) and a double salt of trisodium phosphate and sodium nitrate, the latter compound or double salt differing from normal trisodium phosphate in that sodium nitrate is substituted for sodium hydroxide, resulting in a substance of approximately the following formula:

$$4Na_3PO_4 \cdot NaNO_3 4OH_2O$$

The preparation of this latter substance is disclosed in Patent No. 1,890,453.

These various ingredients are to be employed in certain specified proportions in order to produce the most effective results, the range of variation being as follows:

| | Per cent by weight |
|---|---|
| Trisodium phosphate | 17 to 38 |
| Tetrasodium pyrophosphate | 12 to 38 |
| Double salt | 25 to 75 |

The proportions here given refer to the use of anhydrous tetrasodium pyrophosphate, although a 10-hydrate is also available. In the event the 10-hydrate form is used, however, allowance must be made for the water crystallization contained therein in order to maintain the same molecular relation. A trisodium phosphate hereinabove indicated as being the commercially available 12-hydrate or 44-hydrate form is contemplated by the proportions given.

Since all of these ingredients are in crystallizable form, they are readily mixed and the product in finely divided crystalline form may be marketed without caking and without the use of special containers.

The article of manufacture herein disclosed is readily and quickly soluble in hot or cold water, and the aqueous solutions thus obtained have a high wetting power and exert a remarkable dispersing effect upon solids, oils, greases and other foreign bodies. Aqueous solutions of this product will be found to have less than one-half of the free caustic alkalinity of trisodium phosphate, such solutions having a pH of approximately 12. Such aqueous solutions may contain from about 0.35% to about 3.5% by weight of the generic composition indicated herein, such solutions being obtained, for example, by the addition of from one-fourth ounce to 4 ounces per gallon of water.

When the cleansing agent of this invention is to be used in the washing of clothes, as in a commercial laundry, it may be added to the hot water at the rate of about one-fourth ounce per gallon of water in the washing wheel. It will be found that the washing time is very materially reduced, that the use of a bleach is, in most instances, rendered unnecessary and that the use of sour and bluing may be either dispensed with or markedly reduced. Moreover, a large saving in soap is attained. By the use of the composition of the present invention, it will be found that all fruit acid stains and blood stains are readily eliminated and removed from linens or other clothes being washed and that the washed articles are sterile. In actual commercial practice, twenty-four ounces of the cleansing composition of this invention and twelve ounces of neutral soap were employed per one hundred gallons of water, the use of these materials obviating the necessity of employing bleaches and permitting the elimination of bluing and sour rinses. Fabrics are washed with this composition without shrinkage.

Dish washing machines may be provided with aqueous solutions of the cleansing agent and it will be found that the washing solution thus produced is free rinsing, sudless and does not form calcium and magnesium precipitates upon the glassware, silverware and the like. The articles appear to dry rapidly without water stains and when the composition was employed at the rate of five ounces to fifteen gallons of water at a temperature of 120° F., the dishes were found to be sterile when tested by the swab and distilled water methods. Aqueous solutions of my cleansing agent are eminently suited in washing walls, floors, vehicles (whether painted, lacquered or plain), or wherever an active detergent capable of thoroughly wetting the surface of the object and dispersing foreign solids therefrom is desired. Smooth cement floors in institutions may be effectively cleaned by using but one-half ounce of the composition per gallon of water, the floors maintaining a clean, shiny condition for a prolonged period of time without getting slippery as determined by skid tests. The use of ordinary cleansing soaps on such floors leaves them with a skid test of only two or three pounds, whereas floors cleaned with the composition of this invention show a skid test of approximately fifteen pounds.

I have also discovered that a washing and cleansing aid having additional desirable properties may be made by combining the generic composition hereinabove described with finely divided, preferably calcined, diatomaceous earth, the final composition containing from 40% to 60% by weight of diatomaceous earth. The range of proportions which may be employed is as follows:

| | Per cent |
|---|---|
| Diatomaceous earth | 40 to 60 |
| Trisodium phosphate | 6.8 to 23 |
| Tetrasodium pyrophosphate | 4.8 to 23 |
| Double salt | 10 to 45 |

Cleansing agents containing diatomaceous earth are particularly well adapted for use by commercial laundries handling large amounts of dirty linens, such as hospital linens, overalls and the like. From 0.25 to as high as five ounces of this composition per gallon of water may be used. In actual practice it has been found that by the use of this improved composition, one-third to one-half of the total washing time may be dispensed with and a very material saving made in ingredients. For example, one prolonged experimental run in a commercial laundry resulted in a saving of 75% in the bleach ordinarily employed, a 50% saving in the amount of bluing and a 50% saving of the amount of acid used in sour rinses. In addition, twenty minutes per washing cycle, using a wheel having a 350 lb. capacity, was saved and a very material reduction in the amount of water employed resulted, the latter being due to the elimination of expensive hot soft water rinses normally employed. The exact procedural steps used comprised a cold water break followed by the use of one hundred ten gallons of hot water containing three pounds of the composition for a period of five minutes, then the use of twelve to sixteen ounces of soap for a further five minute operation, drainage, a hot water run for three minutes, drainage and a three minute split rinse. In some instances bleach was used between the hot suds run and the hot rinse. Bluing was occasionally used in the final rinse. It is to be noted that only twelve to sixteen ounces of soap were used per load, whereas ordinarily forty-eight to fifty-six ounces had previously been employed. The finely divided diatomaceous earth appeared to be lubricated by the small amount of soap employed and was discharged with the hot rinse.

Compositions containing the diatomaceous earth in the proportions indicated hereinabove not only facilitate the washing operation on very dirty articles, such as overalls, but in addition, shorten the amount of time and appear to increase the effectiveness of the composition very appreciably. In other words, even when six pounds of the generic composition were employed per one hundred gallons of water, the total washing cycle consumed forty minutes, whereas when the cleansing agent of this invention containing 50% calcined diatomaceous earth was used, the washing cycle was reduced to between twenty and twenty-five minutes. It is to be understood that the amount of cleansing agent may increase with the character of the articles being washed, so that very dirty articles (or articles high in acid, such as towels and sheets) may require as much as eight pounds per one hundred gallons of water.

Attention is called to the fact that the cleansing agent of this composition does not deleteriously affect acetate, acetate fabrics, rayon, silk, wool, combinations, print dyes or vat dyes. Moreover, the fabrics dry soft and are therefore easily ironed. Raw wool may be washed with my composition, thereby eliminating the use of acid and retaining the natural wool oils and the desirable barbs on the wool.

The generic cleansing composition of the present invention is also well adapted for use in fruit and vegetable packing houses and in horticulture. The particular combination of elements herein defined is characterized by its great dispersing effect and ability to wet surfaces. It is capable of thoroughly spreading on foliage, citrus fruit and other normally waxy or oily surfaces, dislodging dirt and spray residues therefrom. It has also been found that the composition of this invention may be used as a base of a spray solution capable of causing scale to separate from leaves, twigs and branches of trees and killing such scale. It repels and is toxic to ants, snails, sowbugs, etc.

The generic composition hereinbefore described may be used in the wash solutions usually employed for washing citrus fruit. It has been found that solutions containing from 3 to 5 ounces of my composition per gallon of water not only permit thorough cleansing of citrus fruit and the removal therefrom of tenaciously adherent soot, scale and other foreign matter, but in addition, fruit washed by these means is highly resistant to subsequent decay. That is, it is not susceptible to attack by the blue and green moulds. Moreover, the solution does not break down or attack the oil cells contained in the outer peel of citrus fruit and as a result, fruit treated with my composition will not shrink as rapidly as fruit which have been washed with kerosene emulsions or soap solutions, since most soap compounds have high active alkalinity, the alkali content apparently breaking down the outer waxy layers sufficiently to permit ready evaporation or loss of oil from the peel.

I have found that for many purposes it is highly desirable to add from about 5% to 15% by weight of potassium nitrate to the generic composition first hereinabove disclosed. Such compositions containing potassium nitrate not only act as cleansing agents when employed in washing various fruits and vegetables, but appear to exert a more beneficial action on the fruit in so far as the keeping quality thereof is concerned. Moreover, the composition of the present invention either alone or with potassium nitrate is extremely effective in the removal of spray residues from fruit and vegetables, such as for example, tomatoes, apples and the like. The removal of spray residues has presented a difficult problem for many years and tremendous quantities of water have been heretofore employed in attempts to satisfactorily remove such toxic residues. Compositions which form suds are not satisfactory and require the use of large quantities of rinsing water. The compositions of the present invention are free rinsing, sudless and have a high dispersing effect so that the time consumed in washing as well as the quantity of water employed is very materially reduced.

Aqueous solutions containing from 2 to as high as 8 ounces of my generic composition per gallon of water and containing, in addition thereto, potassium nitrate in the amounts indicated, may be used in spraying trees or shrubs infested with various forms of scale. Heretofore the eradication of scale from orchards was thought to require the use of heavy oil sprays which smothered the insect and incidentally, often smothered the tree as well. The aqueous solutions of the present invention are much more readily applied, appear to exert a beneficial or fertilizer effect upon the foliage and cause the scale to separate from the foliage, twig or branch on which it is located so that the scale readily falls off in a comatose or dead condition.

The combined properties of the composition of the present invention and the effects obtained by its use for the purposes stated, can not be attained by the successive use of the individual ingredients. When the individual ingredients are separately but successively used, fabrics are damaged in many cases and the results desired will not be obtained. Protracted experimental work shows the desirability of employing the ingredients in the proportions herein disclosed.

Many uses have been disclosed and many other uses will become apparent to those skilled in the art. All changes coming within the scope of the appended claims are embraced thereby.

I claim:

1. A composition for use in making aqueous solutions for the treatment of vegetables and fruit for the removal of spray residues therefrom and for the treatment of trees for the control of scale thereon comprising: 17% to 38% by weight of trisodium phosphate, 25% to 75% by weight of a double salt of trisodium phosphate and sodium nitrate and 12% to 38% by weight of tetrasodium pyrophosphate.

2. A finely divided composition for use in making aqueous solutions for the treatment of vegetables and fruit for the removal of spray residues therefrom and for the treatment of trees for the control of scale thereon comprising: 17% to 38% by weight of trisodium phosphate, 25% to 75% by weight of a double salt of trisodium phosphate and sodium nitrate, 12% to 38% by weight of tetrasodium pyrophosphate and 5% to 15% by weight of potassium nitrate.

3. An aqueous solution having high dispersing and free rinsing properties comprising water and from 0.35% to 3.5% by weight of a composition consisting of from 17% to 38% by weight of trisodium phosphate, 25% to 75% by weight of a double salt of trisodium phosphate and sodium nitrate and 12% to 38% by weight of tetrasodium pyrophosphate.

FREDERIC E. PIERCE.